United States Patent [19]
Glaser et al.

[11] 3,767,521
[45] Oct. 23, 1973

[54] MULTI-PLY, METAL-CLAD SANDWICH PANELS

[75] Inventors: Rudolf Glaser, Ludwigshafen; Alfred Hofmann, Bobenheim-Roxheim; Klaus Bronstert, Carlsberg, all of Germany

[73] Assignee: Badische Anilin & Soda-Fabrik Aktiengesellschaft, Ludwigshafen/Rhein, Germany

[22] Filed: Oct. 7, 1971

[21] Appl. No.: 187,336

[30] Foreign Application Priority Data
Oct. 7, 1970 Germany.................. P 20 49 226.6

[52] U.S. Cl.................. 161/216, 161/217, 161/218, 161/253, 161/254
[51] Int. Cl...................... B32b 15/08, B32b 27/32
[58] Field of Search .................................................
161/216–218, 252–256

[56] References Cited
UNITED STATES PATENTS

| | | | |
|---|---|---|---|
| 2,580,050 | 12/1951 | Sparks et al. .................. | 161/216 X |
| 2,916,469 | 12/1959 | Lal................................. | 161/216 X |
| 3,127,296 | 3/1964 | Guziak........................... | 161/216 X |
| 3,439,064 | 4/1969 | Makowski et al................ | 161/217 X |
| 3,447,460 | 6/1969 | Vincent et al. ................. | 161/216 X |
| 3,459,700 | 8/1969 | Richards......................... | 161/217 X |
| 3,623,943 | 6/1970 | Altenpohl ....................... | 161/216 X |
| 3,689,334 | 9/1972 | Dermody........................ | 161/254 X |
| 3,711,365 | 1/1973 | Pyle................................ | 161/252 X |
| 3,712,848 | 1/1973 | Casey et al. ................... | 161/216 X |
| 3,712,849 | 1/1973 | Robbiati ......................... | 161/218 |

Primary Examiner—Harold Ansher
Attorney—Johnston, Root, O'Keeffe, Keil, Thompson & Shurtleff

[57] ABSTRACT

A multi-ply metal-plated sandwich panel made up of:
1. a first (outer) ply of a corrosion-resistant metal having a thickness of from 0.05 to 1 mm;
2. a second (inner) ply of an ethylene copolymer containing carboxyl groups having a thickness of 0.01 to 0.4 mm as a hot-melt adhesive;
3. a third (inner) ply of a special adhesion promoter having a thickness of 0.01 to 0.4 mm;
4. a fourth (inner) ply of a thermoplastic having a thickness of 2 to 20 mm;
5. a fifth (inner) ply of a special adhesion promoter having a thickness of 0.01 to 0.4 mm;
6. a sixth (inner) ply of an ethylene copolymer containing carboxyl groups having a thickness of 0.01 to 0.4 mm as a hot-melt adhesive; and
7. a seventh (outer) ply of a corrosion-resistant metal having a thickness of 0.05 to 1 mm.

6 Claims, 1 Drawing Figure

PATENTED OCT 23 1973
3,767,521
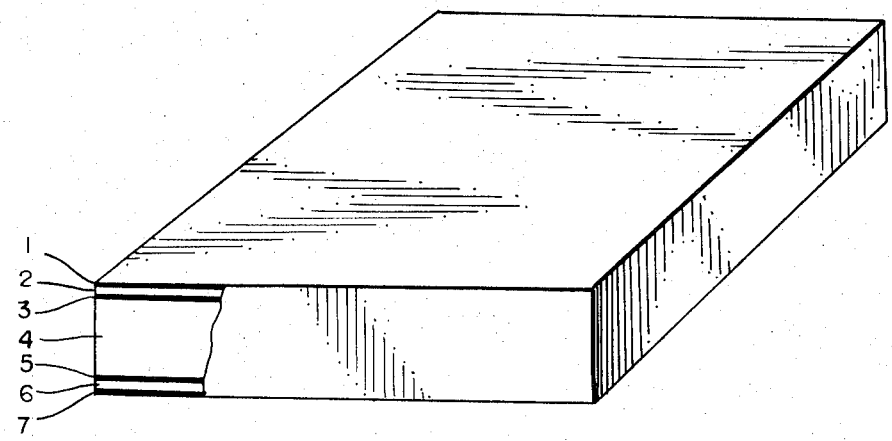

MULTI-PLY, METAL-CLAD SANDWICH PANELS

The present invention relates to multi-ply metal-clad sandwich panels made up of:

1. a first (outer) ply of a corrosion-resistant metal having a thickness of 0.05 to 1 mm;
2. a second (inner) ply of a hot-melt adhesive having a thickness of 0.01 to 0.4 mm;
3. a third (inner) ply of an adhesion promoter having a thickness of 0.01 to 0.4 mm;
4. a fourth (inner) ply of a thermoplastic having a thickness of 2 to 20 mm;
5. a fifth (inner) ply of an adhesion promotor having a thickness of 0.01 to 0.4 mm;
6. a sixth (inner) ply of a hot-melt adhesive having a thickness of 0.01 to 0.4 mm; and
7. a seventh (outer) ply of a corrosion-resistant metal having a thickness of 0.05 to 1 mm.

The individual plies are shown in the accompanying drawing.

Panels of this type have a number of advantages over comparable structures but have certain disadvantages. For example it is a disadvantage that the adherence of the individual plies of the unit to one another is so low that they become detached from one another upon fairly slight mechanical stress. It is another disadvantage that the units have inadequate stiffness for some applications.

The present invention has as an object the provision of panels of the type defined above which have the said disadvantage to a far lesser extent or not at all.

This object is achieved by units in which:
(I) the second and sixth inner plies (2) and (6) consist of a special quaternary polymer; and
(II) the third and fifth inner plies (3) and (5) consist of a ternary mixture of special polymers.

According to the present invention therefore multi-ply metal-clad sandwich panels consist of 1. a first (outer) ply of a corrosion-resistant metal having a thickness of from 0.05 to 1 mm;
2. a second (inner) ply of a hot-melt adhesive having a thickness of from 0.01 to 0.4 mm;
3. a third (inner) ply of an adhesion promoter having a thickness of from 0.01 to 0.4 mm;
4. a fourth (inner) ply of a thermoplastic having a thickness of from 2 to 20 mm;
5. a fifth (inner) ply of an adhesion promoter having a thickness of from 0.01 to 0.4 mm;
6. a sixth (inner) layer of a hot-melt adhesive having a thickness of from 0.01 to 0.4 mm; and
7. a seventh (outer) ply of a corrosion-resistant metal having a thickness of 0.05 to 1 mm. The panels of the invention are characterized as follows:

I. their second and sixth (inner) plies (2) and (6) consist of a quaternary polymer which contains polymerized units of 60 to 90 parts by weight of ethylene, 0.5 to 20 parts by weight of an ethylenically unsaturated carboxylic acid, 0.5 to 20 parts by weight of an ester of an ethylenically unsaturated carboxylic acid and 0.3 to 5 parts by weight of isobutylene, the sum of the parts being 100; and II. their third and fifth (inner) plies (3) and (5) consist of a ternary mixture of:
   a. a homopolymer of a styrene or a copolymer of a styrene which contains polymerized units of up to 35 percent by weight of at least one other monomer;
   b. a homopolymer of a $C_2$ to $C_4$ monoolefin or a copolymer of a $C_2$ to $C_4$ monoolefin which contains up to 35 percent by weight of polymerized units of at least one other monomer; and
   c. a block copolymer having the formula A-B in which A is a block of a polystyrene having a molecular weight of from 10,000 to 150,000, and B is a block of a polyolefin having a molecular weight of from 10,000 to 200,000 in which not more than 10 percent of the carbon-carbon bonds are olefinically unsaturated, the molar ratio of A:B being from 10:90 to 70:30, with the proviso that the ratio by weight of components $a$ and $b$ lies within the range from 4:1 to 1:4, that the total content of component $c$ in the whole mixture is from 5 to 70 percent by weight, and the term styrene refers to a compound having the general formula:

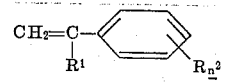

in which $R^1$ denotes H or $CH_3$;
$R^2$ denotes $C_1$ to $C_4$ alkyl and
$n$ denotes zero, 1 or 2.

Concerning the plies of the panels of the invention the following details may be given The layers 1 and 7 may for example consist of copper, aluminum, brass or stainless steel.

The plies 2 and 6 consist of a quaternary polymer having the composition described above. These polymers are known from polymer chemistry. They are obtained in the high pressure polymerization of ethylene for example when polymerization is carried out in the presence of esters of ethylenically unsaturated carboxylic acids derived from tertiary and/or primary and/or secondary alcohols, at temperatures at which the tertiary or secondary ester groups are wholly or partly eliminated from the polymer. The polymers should advantageously have the following characteristics:

density from 0.9 to 1.1 g/ccm, crystalline fraction less than 60 percent, Shore hardness C from 50 to 90. It has been found that quaternary polymers which are particularly suitable for the purpose of the present invention are those which contain polymerized units of 71 to 90 parts by weight of ethylene, 3 to 9 parts by weight of an aliphatic ethylenically unsaturated $C_3$ to $C_4$ carboxylic acid, 1 to 20 parts by weight of a $C_1$ to $C_8$ alkyl ester of an aliphatic ethylenically unsaturated $C_3$ to $C_4$ carboxylic acid and 0.3 to 5 parts by weight of isobutylene, the total of the parts by weight always being 100. The polymers of plies 2 and 6 in the panels may be identical or different from each other.

The plies 3 and 5 consist of a ternary mixture of the composition described above. The individual components of the mixture are also known from polymer chemistry. Homopolymers and particularly homopolymers of simple styrene (i.e. styrene not bearing any substituents) are preferred as component $a$. Examples of copolymers are copolymers of simple styrene with α-methylstyrene, maleic anhydride, acrylic acid and/or butadiene. The polymers are preferably modified to make them impact-resistant.

Preferred components $b$ are again homopolymers, especially homopolymers of ethylene having a density in the range from 0.918 to 0.930 g/ccm. Homopolymers of propylene are however also very suitable. Examples of copolymers are copolymers of $C_2$ to $C_4$ monoolefins with one another and also copolymers of these monoolefins, particularly of ethylene, with vinyl esters such as vinyl acetate and vinyl propionate.

Particularly suitable components c are block copolymers which have been obtained by hydrogenation of corresponding block copolymers of a homopolymer block of simple styrene and a 1,4-homopolymer block of butadiene.

Block copolymers having the formula A-B can be prepared by conventional methods, for example by first polymerizing a vinylaromatic monomer in solution in a hydrocarbon with an alkyl lithium catalyst and further polymerizing on the "living" ends of the chain in the second stage with a 1,3-diene monomer.

It has been found that block copolymers in which the block of polystyrne (A) has a molecular weight of from 20,000 to 80,000 and the block of polyolefin (B) has a molecular weight of from 20,000 to 100,000, the ratio of A:B preferably being from 30:70 to 60:40 are particularly well suited for the purposes of the present invention. In the case of the ternary mixture itself it is advantageous for the weight ratio of the components a and b to be within the range from about 1.5:1 to 1:1 and for the total content of component c in the mixture to be about 20 percent by weight. The mixture can be prepared in a simple manner, for example by mixing the components in the necessary ratio, for example in a kneader or extruder. In the panels the tertiary mixtures of plies 3 and 5 may be identical in composition or may be different from one another.

Ply 4 consists of a thermoplastic material. These include plastics based on polyvinylaromatics, particularly unmodified polymers of styrene and those which have been modified to make them impact-resistant, and also copolymers of styrene with other polymerizable monomers, for example with α-methylstyrene or maleic anhydride, and the copolymers may also be graft copolymers of styrene, for example with acrylic acid and/or butadiene. Other suitable thermoplastics are polyethylenes, particularly those having high density (0.945 to 0.960 g/ccm), polypropylenes and also copolymers of ethylene and of propylene.

In the production of panels according to the invention is is generally advantageous to use the hot-melt adhesive of plies 2 and 6 and the adhesion promoters of plies 3 and 5 in the form of single films of the substances concerned or in the form of double films (two-ply films) of the appropriate substances of plies 2 and 3 and 6 and 5. Since the adhesive effect of the hot-melt adhesive and the adhesion promoter only occurs when these are contacted in the plastic condition with one another and with the other plies of the panel, the hot-melt adhesive and adhesion promoter have to be used at an elevated temperature (90° to 270°C, particularly 150° to 240°C).

The panels may be made by conventional methods. For example a suitable method consists in laying a metal foil (intended for ply 1) in a platen press, and laying thereon in turn a film of hot-melt adhesive (intended for ply 2), a film of an adhesion promoter (intended for ply 3), a ply 4, a film of an adhesion promoter (intended for ply 5), a film of hot-melt adhesive (intended for ply 6), and a metal foil (intended for ply 7). The whole can then be pressed in a frame at an elevated temperature to give an intimate bond. The panels may also be obtained continuously by an analogous method.

Because of their very high flexural rigidity the panels are suitable for example for prefabricated house construction, shipbuilding, automobile construction and also as partitions in building construction.

The commercial quaternary polymer (hot-melt adhesive) used in the form of a film in the following example contains 86.3 parts by weight of ethylene, 3.8 parts by weight of acrylic acid, 8.2 parts by weight of t-butyl acrylate and 1.7 parts by weight of isobutylene in polymerized form; it has a density of 0.928 g/ccm, its crystalline fraction is less than 50 percent and its Shore hardness C is 67.

The ternary mixture used in the example in the form of a film is obtained as follows A mixture is prepared in a kneader (kneading period: 5 minutes, temperature of the material: 190°C) from a. 48 percent by weight of a styrene homopolymer (modified with butadiene rubber to make it impact-resistant, weight ratio of styrene homopolymer: butadiene rubber 10:2);

b. 31 percent by weight of an ethylene homopolymer (density = 0.918 g/ccm; MFI 190/2.16 = 1.5 g/ten minutes) and c. 21 by weight of a hydrogenated two block copolymer of styrene and 1,4-butadiene (formula : A-B in which A is a polystyrene block having a molecular weight of 60,000 and B is a polyolefin block having a molecular weight of 70,000 in which 2.5 percent of the carbon-carbon bonds are olefinically unsaturated; the molar ratio A:B is 1.5:1).

The mixture is then processed into a film by a conventional method.

EXAMPLE

The following are placed in sequence in a platen press:
1. a 0.5 mm aluminum foil,
2. a 0.1 mm film of hot-melt adhesive,
3. a 0.08 mm film of adhesion promoter,
4. a 3 mm board of a styrene homopolymer modified to make it impact-resistant,
5. a 0.08 mm film of adhesion promoter,
6. a 0.1 mm film of hot-melt adhesive and
7. a 0.5 mm aluminum foil.

The whole is then pressed to make an intimate assembly at 200° C for three minutes at a pressure of 0.5 kg/cm².

The panel thus obtained has very good flexural stiffness; its individual plies adhere very firmly to one another.

We claim:

1. A multi-ply, metal-clad sandwich panel made up of
   1. a first (outer) ply of a corrosion resistant metal having a thickness of 0.05 to 1 mm;
   2. a second (inner) ply of a hot-melt adhesive having a thickness of 0.01 to 0.4 mm;
   3. a third (inner) ply of an adhesion promoter having a thickness of 0.01 to 0.4 mm;
   4. a fourth (inner) ply of a thermoplastic having a thickness of 2 to 20 mm;
   5. a fifth (inner) ply of an adhesion promoter having a thickness of 0.01 to 0.4 mm;
   6. a sixth (inner) ply of a hot-melt adhesive having a thickness of 0.01 to 0.4 mm; and 7. a seventh (outer) ply of a corrosion-resistant metal having a thickness of 0.05 to 1 mm, wherein I. said second and sixth (inner) plies (2) and (6) consist of a quaternary polymer containing 60 to 90 parts by weight of ethylene units, 0.5 to 20 parts by weight of an ethylenically unsaturated carboxylic acid, 0.5 to 20 parts by weight of an ester of an ethylenically unsaturated carboxylic acid and 0.3 to 5 parts by weight of isobutylene, the total of the parts always being 100, and II. said third and fifth (inner) plies (3) and (5) consist of a ternary mixture of:
   a. a homopolymer of a styrene or a compolymer of a styrene which contains up to 35 percent by weight of other monomer in polymerized form;
   b. a homopolymer of a $C_2$ to $C_4$ monoolefin or a copolymer of a $C_2$ to $C_4$ monoolefin which contains up to 35 percent by weight of polymerized units of other monomers; and
   c. a block copolymer having the formula A-B in which A denotes a block of a polystyrene having a molecular weight of from 10,000 to 150,000; B denotes a block of a polyolefin having a molecular weight of from 10,000 to 200,000 in which not more than 10 percent of the carbon-carbon bonds are olefinically unsaturated; and the molar ratio of A:B is from 10:90 to 70:30, with the proviso that the ratio by weight of the components $a$ and $b$ is within the range from 4:1 to 1:4, that the total content of component $c$ in the mixture is from 5 to 70 by weight and that the term "styrene" means a compound having the general formula:

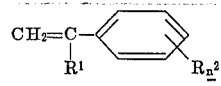

in which $R^1$ denotes H or $CH_3$; $R^2$ denotes $C_1$ to $C_4$ alkyl and $n$ denotes zero, 1 to 2.

2. A multi-ply, metal-clad sandwich panel as claimed in claim 1 wherein plies 1 and 7 consist of copper, aluminum, brass or stainless steel.

3. A sandwich panel as claimed in claim 1 wherein the polymer of plies 2 and 6 has a density of from 0.9 to 1.1 g/ccm, a crystalline fraction of less than 60 percent, and a Shore hardness C of from 50 to 90.

4. A sandwich panel as claimed in any of claim 1 wherein the quaternary polymer of plies 2 and 6 consists of 71 to 90 parts by weight of ethylene units, 3 to 9 parts by weight of an aliphatic ethylenically unsaturated $C_3$ to $C_4$ carboxylic acid, 1 to 20 parts by weight of a $C_1$ to $C_8$ alkyl ester of an aliphatic ethylenically unsaturated $C_3$ to $C_4$ carboxylic acid and 0.3 to 5 parts by weight of isobutylene, the parts totalling 100.

5. A sandwhich panel is claimed in any of claim 1 wherein component $c$ is a block copolymer in which the block of polystyrene has a molecular weight of 20,000 to 80,000 and the block of polyolefin B has a molecular weight of 20,000 to 100,000.

6. A sandwich panel as claimed in claim 5 wherein the ratio by weight of A:B is from 30:70 to 60:40.

* * * * *

UNITED STATES PATENT OFFICE
CERTIFICATE OF CORRECTION

Patent No. 3,767,521    Dated October 23, 1973

Inventor(s) Rudolf Glaser et al

It is certified that error appears in the above-identified patent and that said Letters Patent are hereby corrected as shown below:

Column 1, line 12, "promotor" should read -- promoter --.

Column 3, line 18, "polystyrne" should read -- polystyrene --.

Column 4, line 16, insert -- ; -- after "follows".

Column 4, line 26, insert -- percent -- after "21".

Column 5, line 14, "compolymer" should read -- copolymer --.

Column 5, line 32, insert -- percent -- after "70".

Signed and sealed this 1st day of October 1974.

(SEAL)
Attest:

McCOY M. GIBSON JR.                C. MARSHALL DANN
Attesting Officer                  Commissioner of Patents